United States Patent [19]

Sobeski et al.

[11] Patent Number: 5,977,973
[45] Date of Patent: Nov. 2, 1999

[54] WINDOW LINKING

[75] Inventors: David A. Sobeski, Redmond; Philippe P. A. Nicolle, Kirkland, both of Wash.

[73] Assignee: Microsoft Corporation, Redmond, Wash.

[21] Appl. No.: 08/856,427

[22] Filed: May 14, 1997

[51] Int. Cl.[6] ....................................................... G06F 3/14
[52] U.S. Cl. .......................................... 345/342; 345/346
[58] Field of Search ..................................... 345/340, 341, 345/342, 343, 344, 345, 346, 347, 348, 349, 350, 351, 352, 339, 326, 327–338

[56] References Cited

U.S. PATENT DOCUMENTS

| 5,404,439 | 4/1995 | Moran et al. | 345/339 |
|---|---|---|---|
| 5,564,004 | 10/1996 | Grossman et al. | 345/340 |
| 5,801,699 | 9/1998 | Hocker et al. | 345/348 |
| 5,805,166 | 9/1998 | Hall, Jr. et al. | 345/349 |

OTHER PUBLICATIONS

DiLascia, Paul, "More Fun With MFC: DIBs, Palettes, Subclassing, and a Gamut of Reusable Goodies," *Microsoft Systems Journal,* Jan. 1997, pp. 17–20, 22–24, 26–28, and 30–33.

*Primary Examiner*—Steven P. Sax
*Attorney, Agent, or Firm*—Leydig, Voit & Mayer, Ltd.

[57] ABSTRACT

A window linking system is provided that links windows on a video display to reduced window clutter. When two windows are linked, the linked windows combine to form one larger window, known as an aggregate window, that is manipulated as a single window. By linking windows together, fewer individual windows are contained on the workspace of a video display, which reduces window clutter and which allows a user to more easily reorganize their workspace since fewer windows require manipulation. The window linking system implements window linking by using a container. A "container" is a screen object like a window to which another window, called a docking window, can be linked. The window linking system detects when a docking window is attempting to be linked with a container by determining whether the docking window is being dropped at the border of the container. If the docking window is being dropped at the border of the container, the window linking system links the docking window with the container, displaying both the container and the docking window adjacent to each other. After being linked, the linked windows form an aggregate window that is manipulated as a single window. As such, all resizing of the aggregate window, movement of the aggregate window, minimization of the aggregate window, and maximization of the aggregate window is applied to the aggregate window as a whole, including both the container and the docking window.

45 Claims, 19 Drawing Sheets

WINDOW LINKING

TECHNICAL FIELD

The present invention relates generally to data processing systems and, more particularly, to linking windows displayed on a video display of a data processing system.

BACKGROUND OF THE INVENTION

A "window" is a specially delineated area of a video display that is typically used to display information, such as a document or a message, to a user. Each window acts independently, as if it were a virtual display device, and each window is manipulated independently. The manipulations performed on a window include resizing the window or moving the window. A program, like an operating system or an application program, may display one or more windows.

FIG. 1 depicts a conventional window 100. The window 100 has a display area 110 that displays window contents, such as the text of a document, and a title bar 102 that displays meaningful information, like a title, to the user so that the user can identify the purpose of the window. Sometimes a window 100 may display a scroll bar when the window has more contents than can be displayed in the display area 110 at one time. The title bar 102 has a number of buttons 104, 106 and 108. Button 104 is used to close the window. When the window 100 is associated with an application program that displays only one window, activation of button 104 terminates both the window and the application program. Button 106 is used to enlarge the window so that it covers more of the video display. After being enlarged to cover the entire screen of the video display, button 106 can be activated again to return the window to its original size. When button 106 is used in this capacity, it is known as a "restore" button. Button 108 is used to minimize the representation of the window 100. The phrase "minimizing a window" refers to representing the window in a manner which is not fully functional, like representing the window as an icon or as a button. Once minimized, double-clicking on the icon maximizes the window 100 into a fully-functional representation of the window.

Some windowing systems, such as the Microsoft® Windows® 95 operating system from Microsoft Corporation of Redmond, Wash., are message based such that operations are achieved by passing messages between windows. In these systems, a window is created based upon a window class that identifies a window procedure which processes messages that are sent to the window. The windowing system supports a RegisterClass( ) function that enables an application program to register window classes.

In general, each application program in the windowing system with a user interface has an associated window procedure for each window that the application program displays. For each application program having a user interface, the windowing system maintains a message queue. When an event occurs, the event is translated into a message that is put into the message queue for the application program. Such an event includes keystrokes, timer events, manipulation of the mouse cursor, or manipulation of the mouse button. The "mouse cursor" reflects movements of a mouse input device on the video display. The mouse input device typically has a mouse button that activates the mouse. For example, when the user depresses the mouse button to activate the mouse, the operating system generates a "MOUSE_DOWN" event and sends a corresponding message to the message queue of the application program. The application program retrieves and delivers messages in the message queue to the proper window procedure for processing (i.e., the window procedure of the window for which the event is intended). The window procedure, in turn, has a number of functions that the window procedure invokes depending on the specific event that has occurred. For example, the window procedure for a word processing program may invoke a specific function when both a MOUSE_DOWN event has been received and the mouse cursor is within the display area of the window. Such a function may, for example, begin highlighting the text to indicate that the highlighted text is being selected. Since the message queue maintains the messages received from the windowing system, during the processing of functions invoked from a window procedure, the functions can make requests of the message queue to retrieve messages from the message queue.

The windowing system provides the ability to "subclass" either a control or another window. A "control" is a screen object, like a button or a scroll bar, that can be manipulated by the user to perform an action. A window sometimes contains one or more controls. The controls of the windowing system act much like windows by receiving messages from the windowing system. When subclassing a control or a window, the windowing system allows a program to receive all of the messages destined for that control or window. This technique is advantageous when a window displays a control on another window. For example, to integrate a scroll bar into the functionality of a window, the window needs to manage the operations of the scroll bar and, thus, needs to intercept the messages destined for the scroll bar to control its functionality. By intercepting the messages through subclassing, the program determines how the scroll bar behaves in response to a given message.

Although some application programs display many windows, the available space on the video display, known as the work space, is limited. As the number of windows displayed on the video display increases, it becomes more difficult for the user to perform their work on the workspace of the video display, as the workspace appears cluttered, much like a desk appears cluttered when lots of papers are strewn across it. Window clutter makes it more difficult for the user to perform their work, and thus, it is desirable to reduce window clutter.

SUMMARY OF THE INVENTION

A window linking system is provided that links windows on a video display to reduced window clutter. When two windows are linked, the linked windows combine to form one larger window, known as an aggregate window, that is manipulated as a single window. By linking windows together, fewer individual windows are contained on the workspace, which reduces window clutter and which allows a user to more easily reorganize their workspace since fewer windows require manipulation.

The window linking system implements window linking by using a container. A "container" is a screen object like a window to which another window, called a docking window, can be linked. The window linking system detects when a docking window is attempting to be linked with a container by determining whether the docking window is being dropped at the border of the container. If the docking window is being dropped at the border of the container, the window linking system links the docking window with the container, displaying both the container and the docking window adjacent to each other. After being linked, the linked windows form an aggregate window that is manipulated as a single window. As such, all resizing of the aggregate window, movement of the aggregate window, minimization of the aggregate window, and maximization of the aggregate window is applied to the aggregate window as a whole, including both the container and the docking window.

In accordance with a first aspect of the present invention, a method is provided in a computer system having a video display for displaying information. The method displays a plurality of separate windows on the video display, where each separate window is manipulated independently of other separate windows. Additionally, the method links two of the plurality of separate windows to form an aggregate window that is manipulated as a single window.

In accordance with a second aspect of the present invention, a computer system is provided comprising a video display, an input device, a memory, and a processor. The video display displays information, and the input device receives input from a user. The memory contains a program for separately displaying two windows on the video display and for receiving first input from the user via the input device. In response to receiving the first input, the program links the two windows to form an aggregate window. The program also receives second input requesting manipulation of the aggregate window and manipulates the aggregate window as a single window in response to receiving the second input. The processor runs the program.

DETAILED DESCRIPTION OF THE INVENTION

A preferred embodiment of the present invention provides a window linking system that links windows on a video display to reduce window clutter. When two windows are linked, the linked windows combine to form one larger window, known as an aggregate window, that is manipulated as a single window. By linking windows together, fewer individual windows are contained on the workspace, which reduces window clutter and which allows a user to more easily reorganize their workspace since fewer windows require manipulation.

The window linking system implements window linking by using a container. A "container" is a screen object like a window to which another window, called a docking window, can be linked. The window linking system detects when a docking window is attempting to be linked with a container by determining whether the docking window is being dropped at the border of the container. If the docking window is being dropped at the border of the container, the window linking system links the docking window with the container, displaying both the container and the docking window adjacent to each other. After being linked, the linked windows form an aggregate window that is manipulated as a single window. As such, all resizing of the aggregate window, movement of the aggregate window, minimization of the aggregate window, and maximization of the aggregate window is applied to the aggregate window as a whole, including both the container and the docking window.

An example of window linking as provided by the preferred embodiment of the present invention is detailed below relative to the Microsoft® Visual Basic programming environment. However, one skilled in the art will appreciate that the techniques described below can be implemented within a different application program, implemented as part of more than one application program, or implemented within an operating system.

Figure 1:
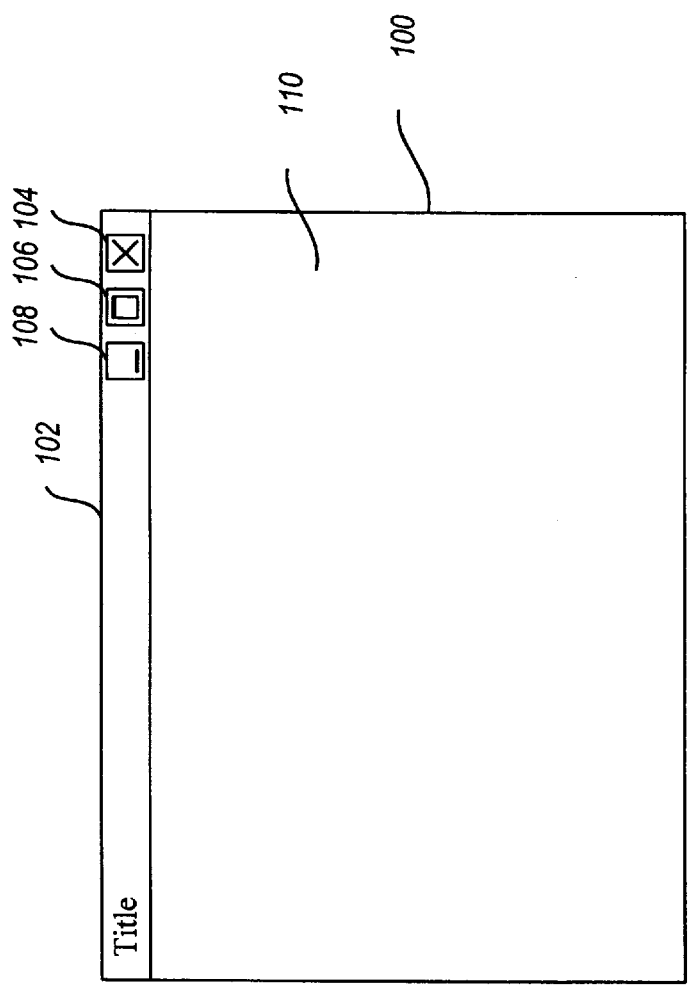
FIG. 1 depicts a conventional window displayed on a video display of a computer system.
Figure 2A:
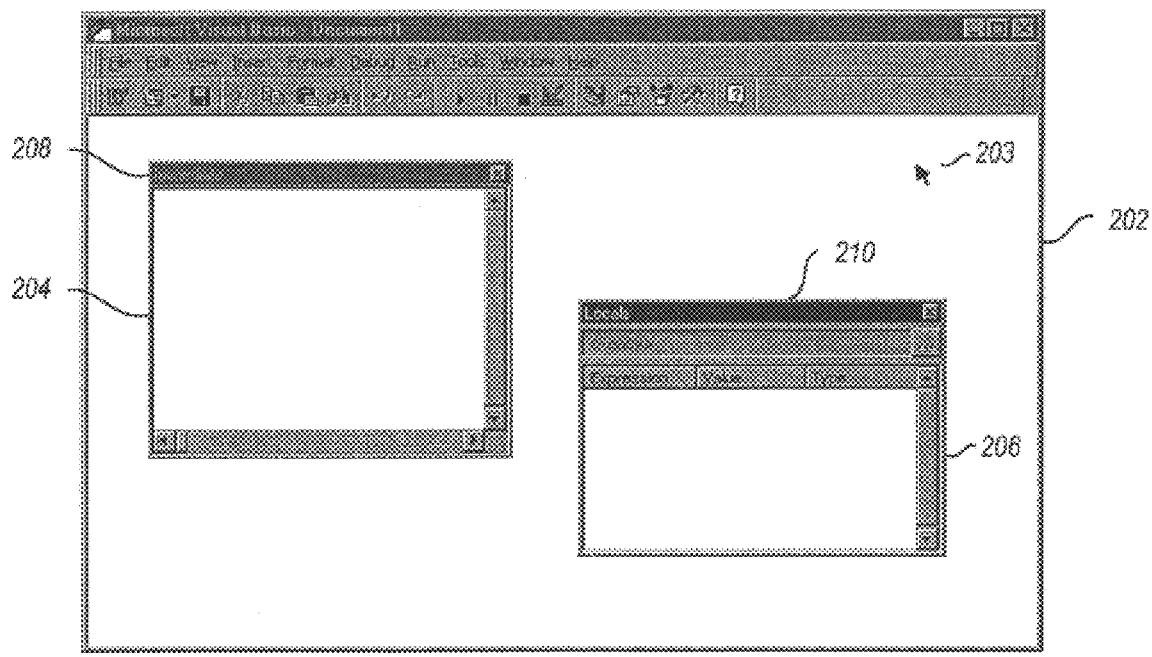
FIGS. 2A–2G depict an example of the window linking performed by a preferred embodiment of the present invention.
Figure 2B:
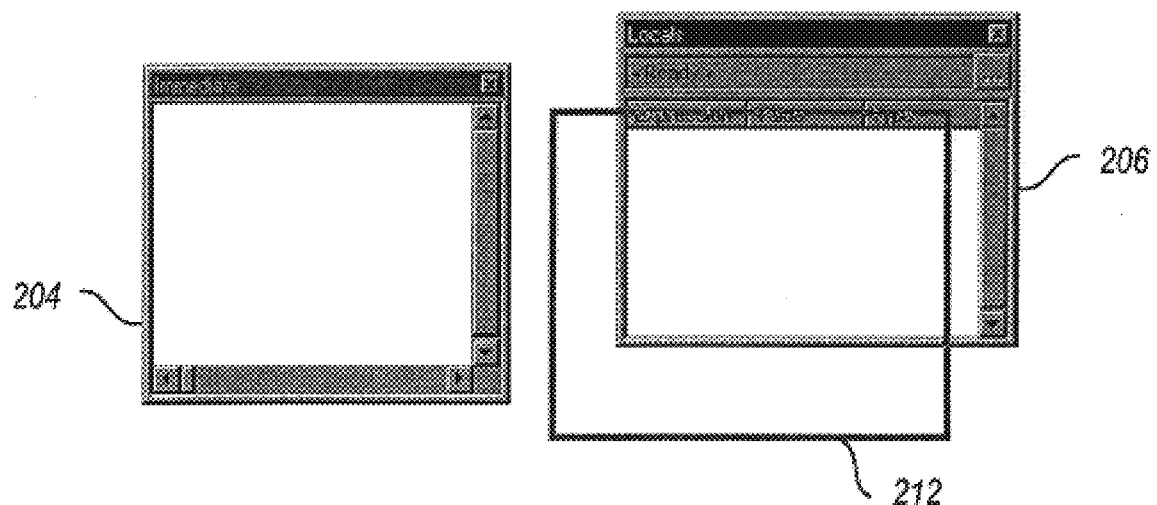
Figure 2C:
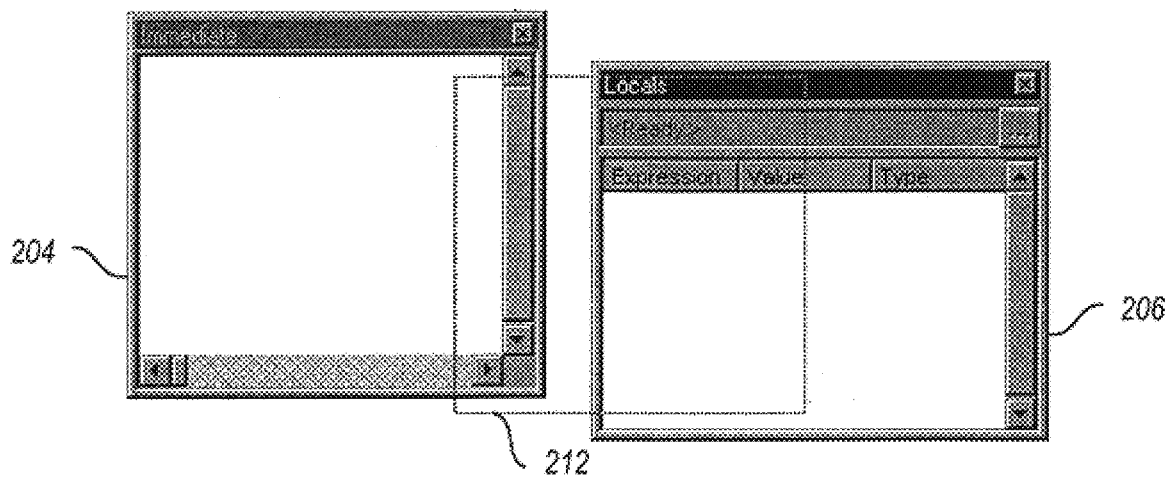

FIG. 2A depicts a window 202 displayed by a computer program on a video display of a computer system. Within the window 202 are two additional windows: window 204 and window 206. Each window has a respective title bar 208 and 210. In order to link window 206 with window 204, the user manipulates the input device (i.e., the mouse) so that the mouse cursor 203 is located directly over the title bar 210 of window 206. The mouse cursor 203 reflects movement of the mouse on the video display. In a preferred embodiment, the mouse input device has two buttons: a left button and a right button. All references below to "the" mouse button refer to use of the left mouse button, although one skilled in the art will appreciate that such functionality can be provided by the right mouse button or by activating another type of input device, such as a pen device or other pointing input device. After positioning the mouse cursor 203 over the title bar 210, the user depresses the mouse button and holds the mouse button down to indicate to the windowing system that the window is to be moved. As shown in FIG. 2B, upon depressing the mouse button and holding the mouse button down, the user moves the mouse, and as the mouse moves with the mouse button depressed, a ghost 212 (silhouette) of window 206 appears indicating the location of the window when the user releases the mouse button. As shown in FIG. 2C, when the user moves the ghost 212 to be over another window that it can be linked with, a container, the ghost 212 changes appearance (i.e., it becomes thinner) to indicate to the user that upon release of the mouse button, the window 206 will be linked with the window (e.g., window 204) over which the ghost appears.

Figure 2D:
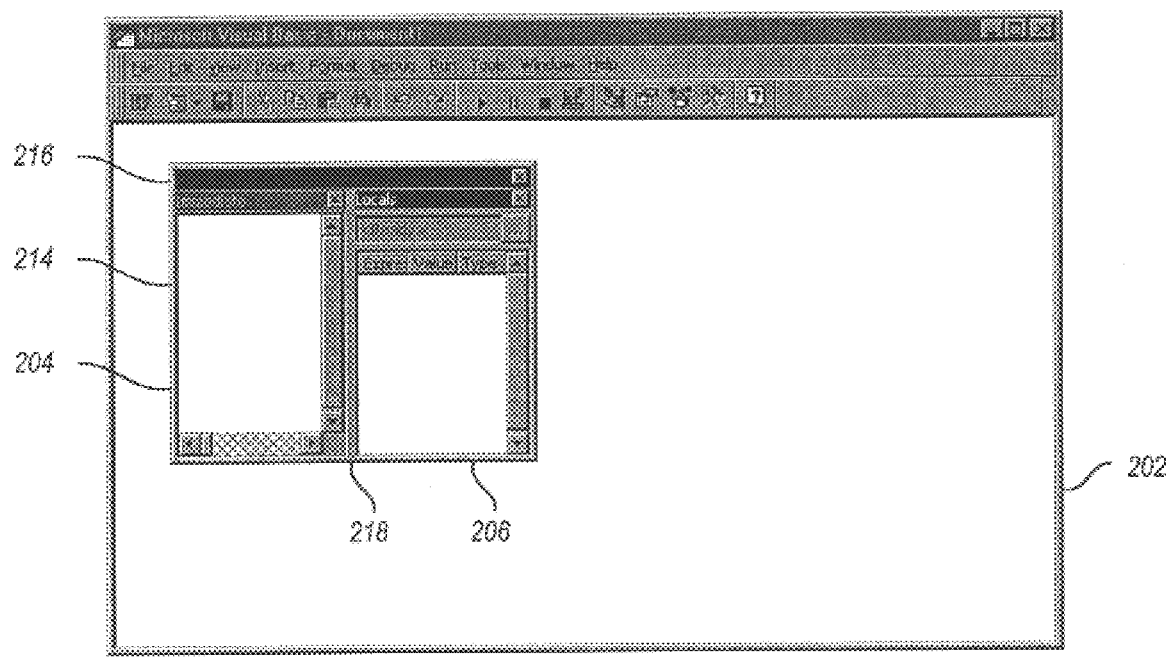

While the ghost is in the altered state shown in FIG. 2C, if the user releases the mouse button, windows 206 and 204 are linked to form an aggregate window 214, as shown in FIG. 2D. When window 206 is linked with window 204, the resultant window, aggregate window 214, contains a title bar 216 to indicate to the user that the window is an aggregate window and is manipulated as a single window. Separating windows 206 and 204 in the aggregate window 214 is a splitter bar 218 that may be used to readjust the proportionality of the sizes of windows 206 and 208 within the aggregate window 214. This readjustment occurs by the user positioning the mouse cursor over the splitter bar, depressing the mouse button, moving the mouse, and then releasing the mouse button.

When window 206 is linked with window 204, window 206 is known as the "docking window" and window 204 is known as the "container." As can be seen from an examination of FIG. 2D, when windows 206 and 204 are linked together, the aggregate window 214 is the same size as the container 204 was before the linking operation. However, after the linking operation, the container 204 shrinks in size to allow room for window 206 within the aggregate window 214. Although the aggregate window 214 is described as being the same size as the container 204 after the linking operation, one skilled in the art will appreciate that the aggregate window may instead be the same size as both windows in at least one dimension (e.g., width). Alternatively, one skilled in the art will recognize that the aggregate window 214 may be a different size after the linking operation. Since the aggregate window 214 is fixed at the prelinking size of the container 204, the height of the docking window 206 is changed to the height of the container when the windows are linked side-by-side. However, the width of the docking window 206 and the container 204 within the aggregate window 214 is not fixed. Specifically, the amount of space within the aggregate window 214 that the container 204 and the docking window 206 utilize depends upon the prelinking ratio of their widths. For example, if the width of the container 204 were twice the width of the docking window 206, when the aggregate window 214 is formed, the width of the container 204 will be two-thirds of the width of the aggregate window 214 and the width of the docking window 206 will be one-third of the width of the aggregate window to maintain the two-to-one ratio. If, however, the docking window 206 is wider than the container 204, both the width of the docking window and the container are set to 50% of the width of the aggregate window 214.

It should be appreciated that, in the example of FIG. 2D, window 206 is linked to the right-hand side of window 204. However, window 206 can be linked to the top, left, or bottom of window 204. When window 206 is linked to either side of window 204, the rules for determining the respective sizes of the container 204 and the docking window 206 within the aggregate window 214 apply as stated above. However, when the docking window 206 is linked to either the top or bottom of container 204, the width of the docking window is changed to the original width of the container, and the height of the docking window and the container varies depending upon the prelinking ratio of the heights of the windows. In the situation where the docking window 206 is taller than the container 204, both the container and the docking window are set to 50% of the height of the aggregate window 214.

Figure 2E:
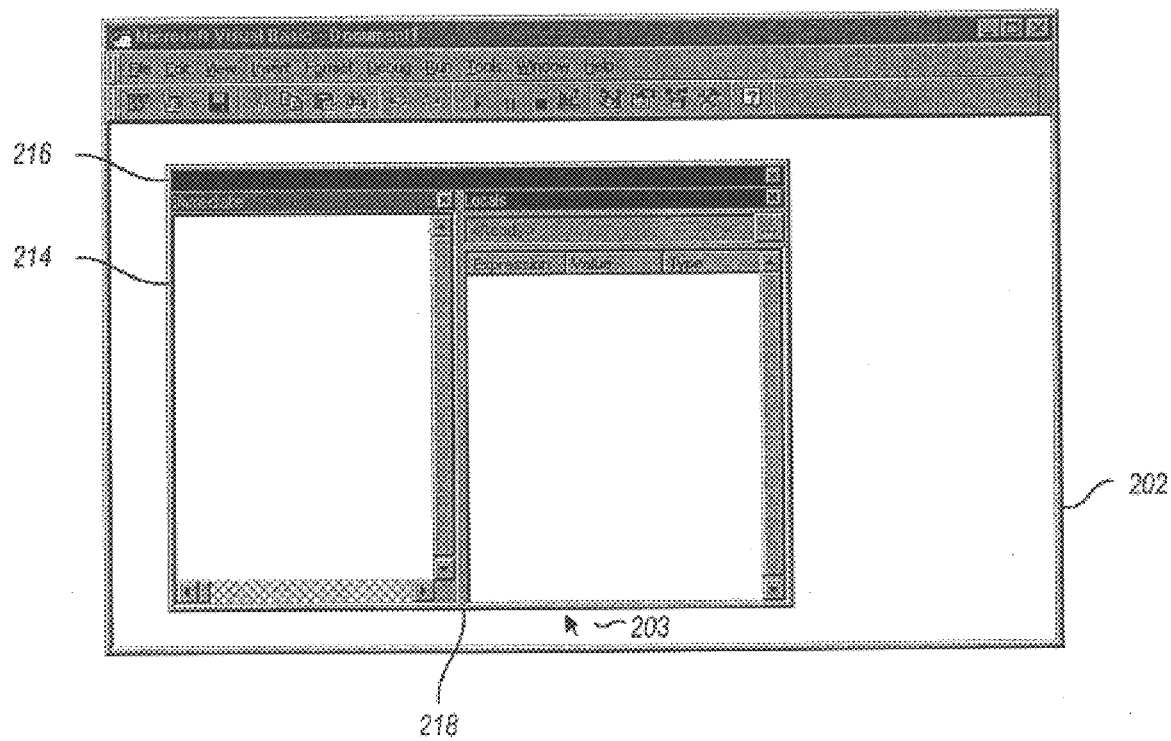

As previously stated, once an aggregate window 214 is formed, the aggregate window is manipulated as a single window. For example, as shown in FIG. 2E, the aggregate window 214 can be resized by positioning the mouse cursor over the lower right-hand corner of the window, depressing the mouse button, and dragging the window so that it increases in size. When this resizing operation occurs, although the aggregate window 214 increases in size, the ratio of the width of the container 204 to the width of the docking window 206 remains constant.

Figure 2F:
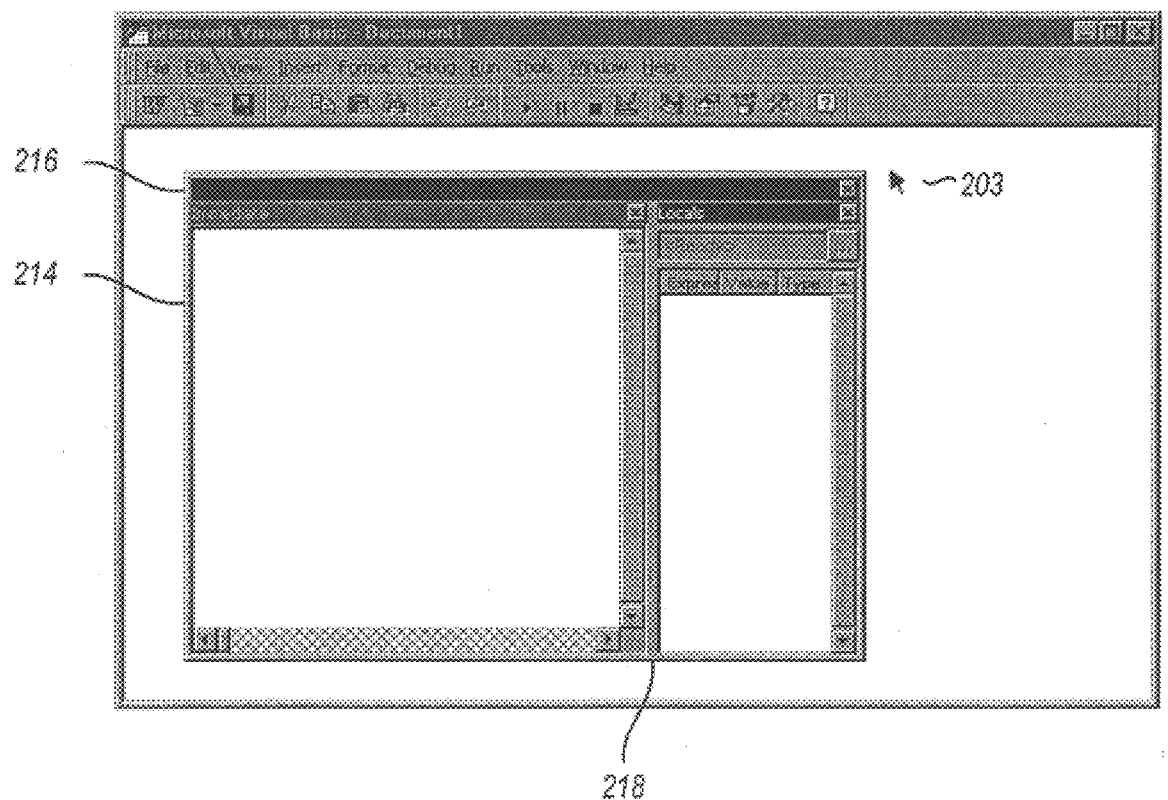

Also as previously stated, a splitter bar 218 is displayed in the aggregate window 214 to change the width of the container 204 and the docking window 206. The user manipulates the splitter bar 218 by positioning the mouse cursor 203 over the splitter bar, depressing the mouse button, moving the mouse to a new position, and releasing the mouse button. As depicted in FIG. 2F, when these steps are performed, the splitter bar 218 is moved to a new location and the width of both the container 204 and the docking window 206 changes.

Figure 2G:
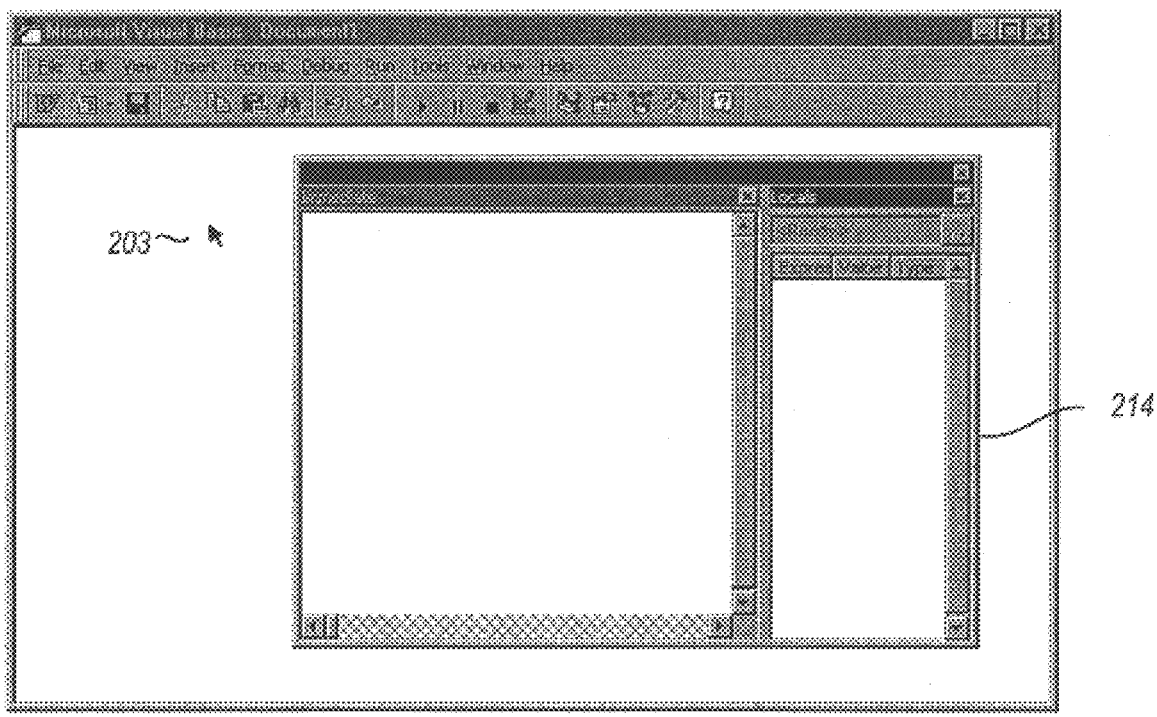

Another example of manipulating the aggregate window 214 as a single window is if the user attempts to move the aggregate window. A user moves the aggregate window 214 by positioning the mouse cursor 203 over the title bar 216 of the aggregate window, depressing the mouse button, moving the mouse to a new location, and releasing the mouse button. FIG. 2G depicts the aggregate window 214 after being moved from the position depicted in FIG. 2F.

Figure 3A:
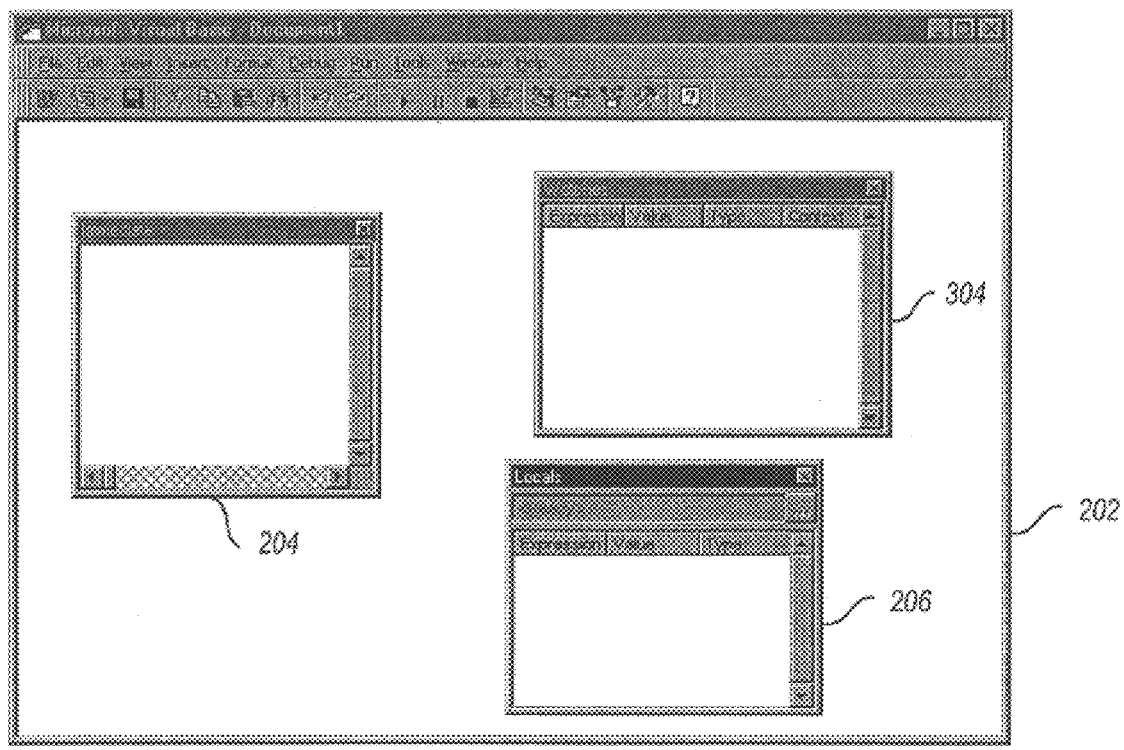
FIGS. 3A–3E depict a more complicated example of the window linking performed by a preferred embodiment of the present invention.
Figure 3B:
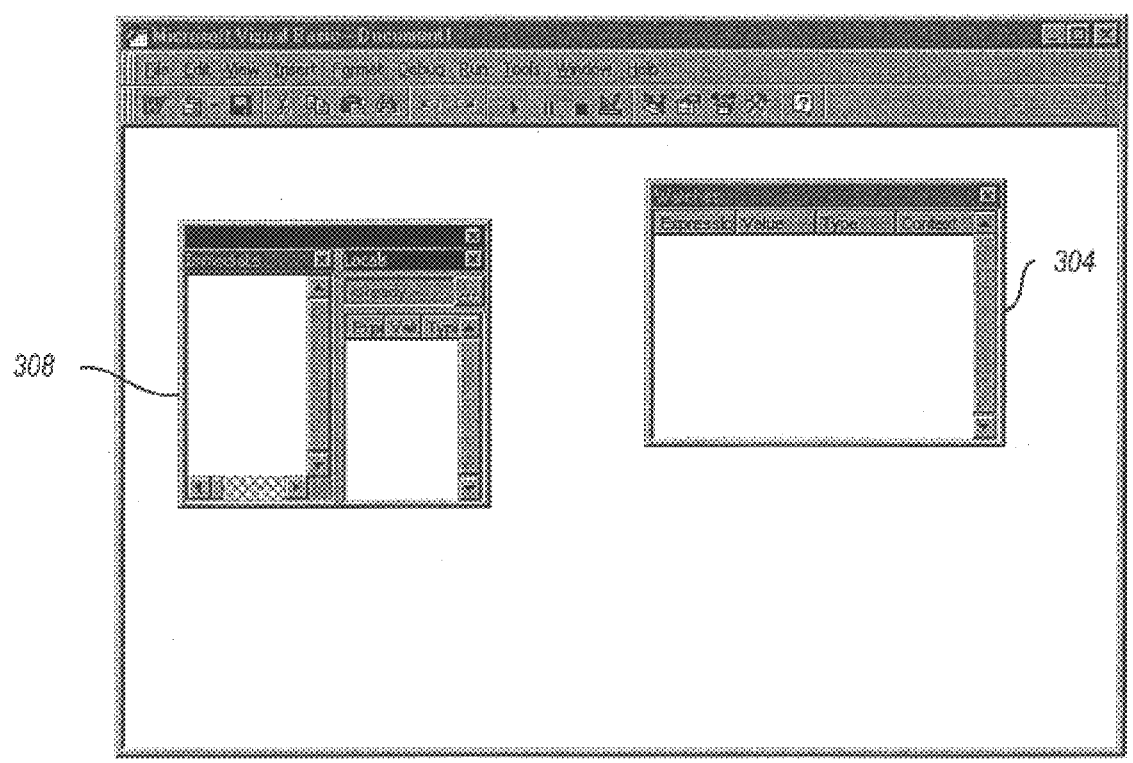
Figure 3C:
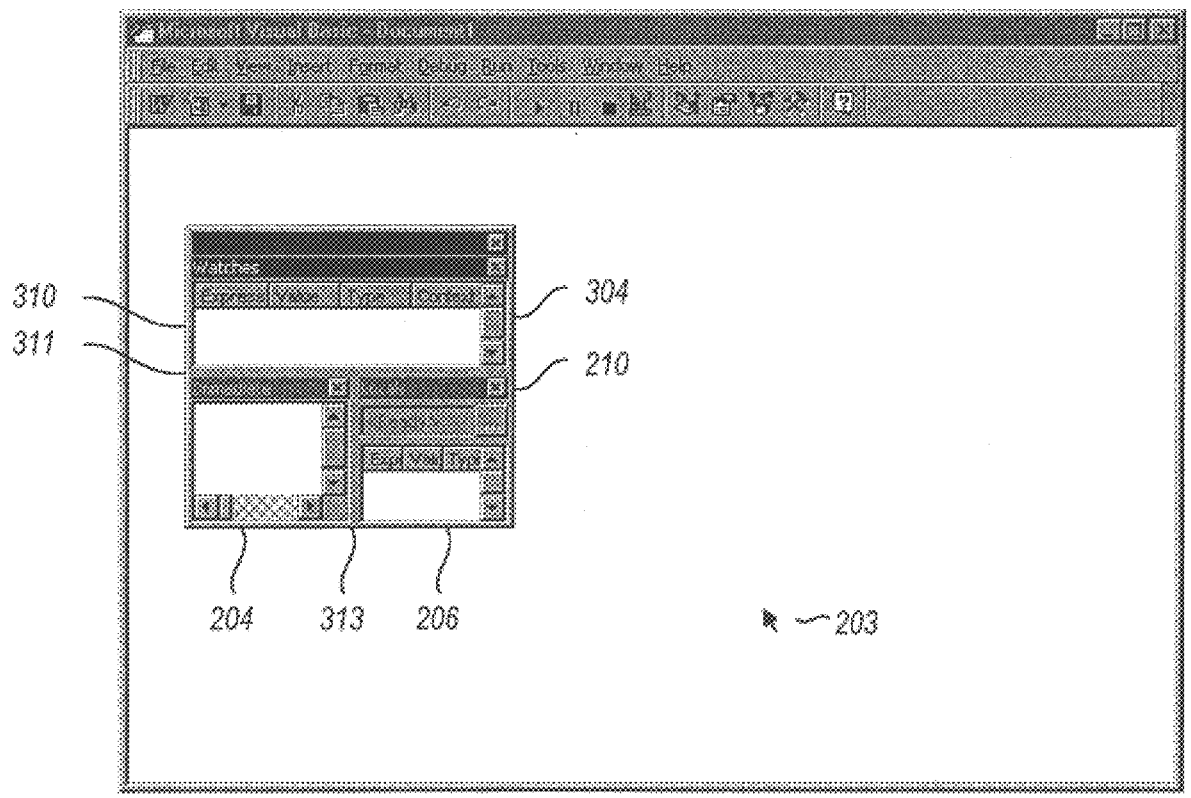
Figure 3D:
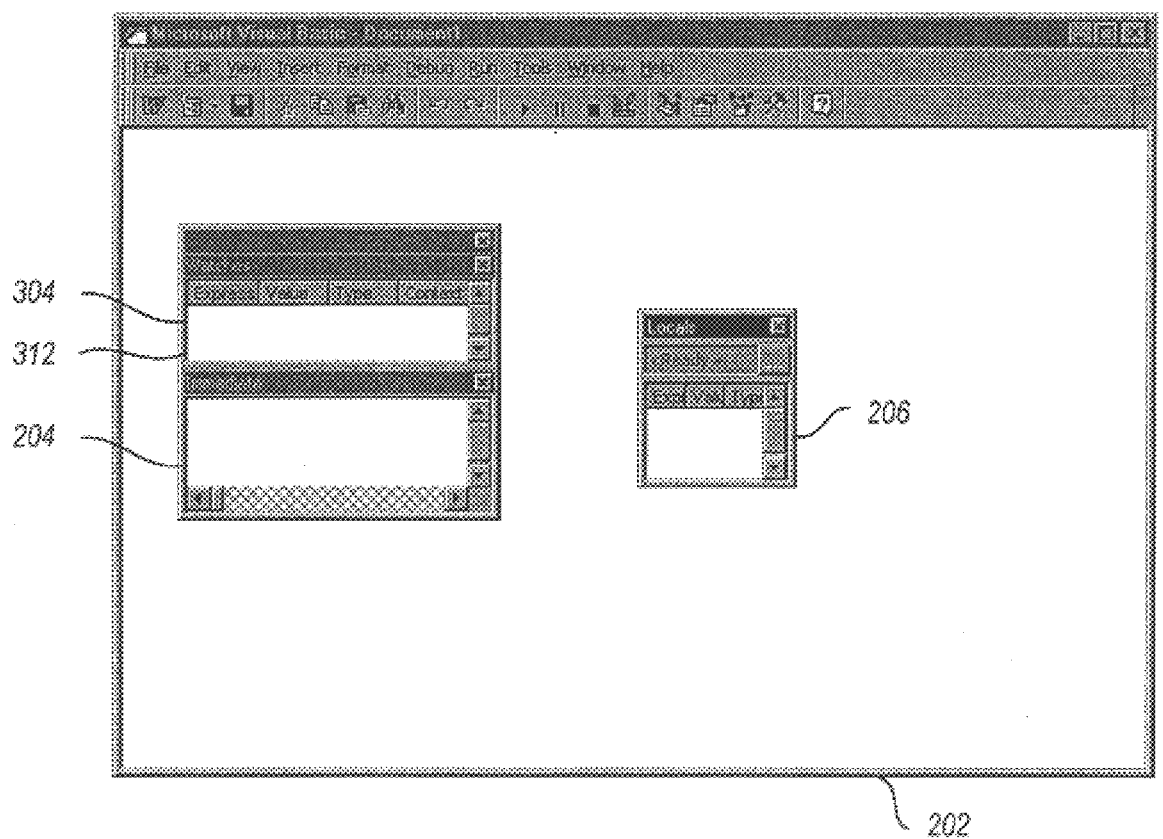
Figure 3E:
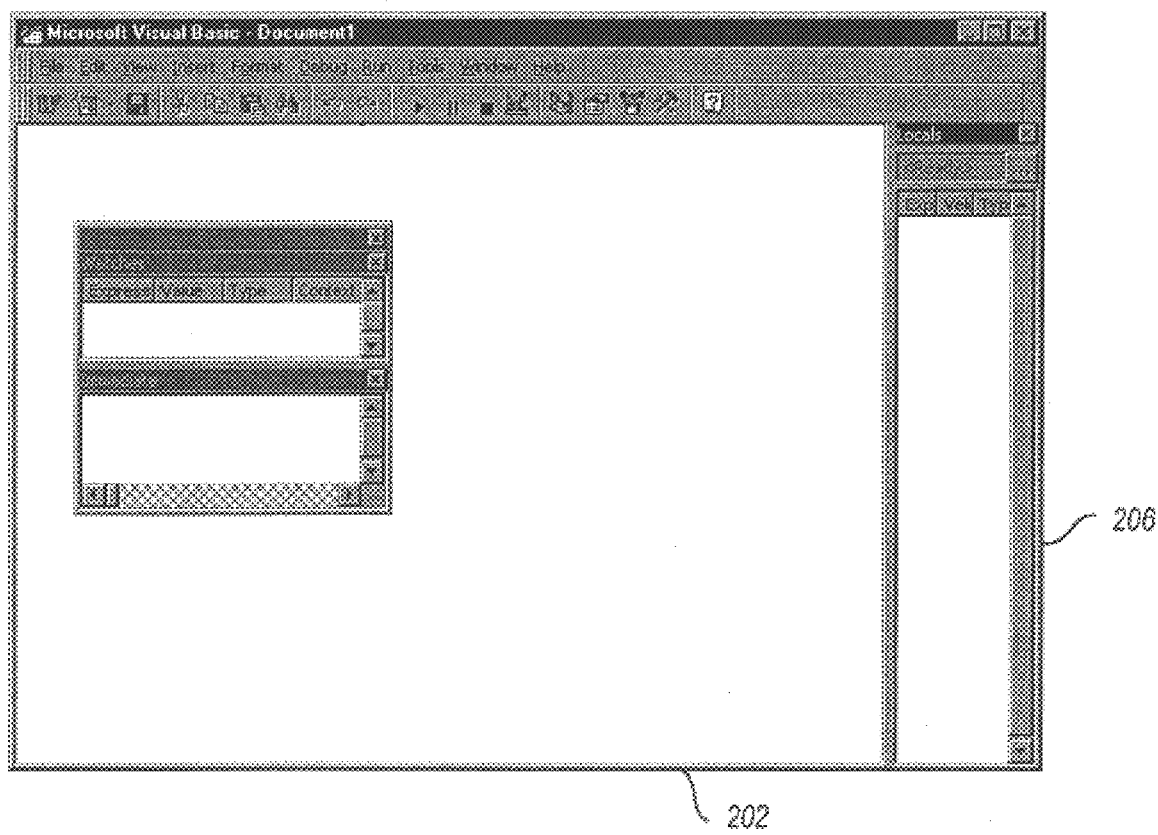

FIGS. 3A–3E depict a more complicated example of the window linking of the present invention. FIG. 3A depicts window 202 displaying window 204, window 206, and window 304. As shown in FIG. 3B, the user links window 204 to the right-hand side of window 206 to form aggregate window 308. As shown in FIG. 3C, the user then links window 304 to the top of aggregate window 308 to form a new aggregate window 310. It should be noted that aggregate window 310 has two splitter bars 311 and 313. Splitter bar 311 adjusts the height of window 304 and the heights of both windows 204 and 206. Splitter bar 313 adjusts only the width of windows 204 and 206. After forming the aggregate window 310, the user can unlink window 206 by positioning the mouse cursor 203 over the title bar 210 of window 206, depressing the mouse button, and moving the mouse in a direction away from the aggregate window 210. After performing these steps, the user releases the mouse button and window 206 becomes unlinked from aggregate window 310 as depicted in FIG. 3D. After unlinking window 206 from the aggregate window 310, window 206 is separated from the aggregate window 310 and is thereafter manipulated independently of the aggregate window. Once separated, window 206 can be linked to another window, such as window 202, as shown in FIG. 3E.

Although a preferred embodiment has been described as linking two or more subwindows within a larger window, the present invention can be used to link two or more windows that are not displayed as part of another window. Also, although the windows are depicted as being rectangular, the present invention can be used with windows of other shapes. Additionally, although an example has been provided where the windows linked are displayed by a single program, one skilled in the art will appreciate that each window may be displayed by a separate program, and one skilled in the art will appreciate that the window linking can be performed in response to input from another source other than a mouse, such as a keyboard.

Figure 4:
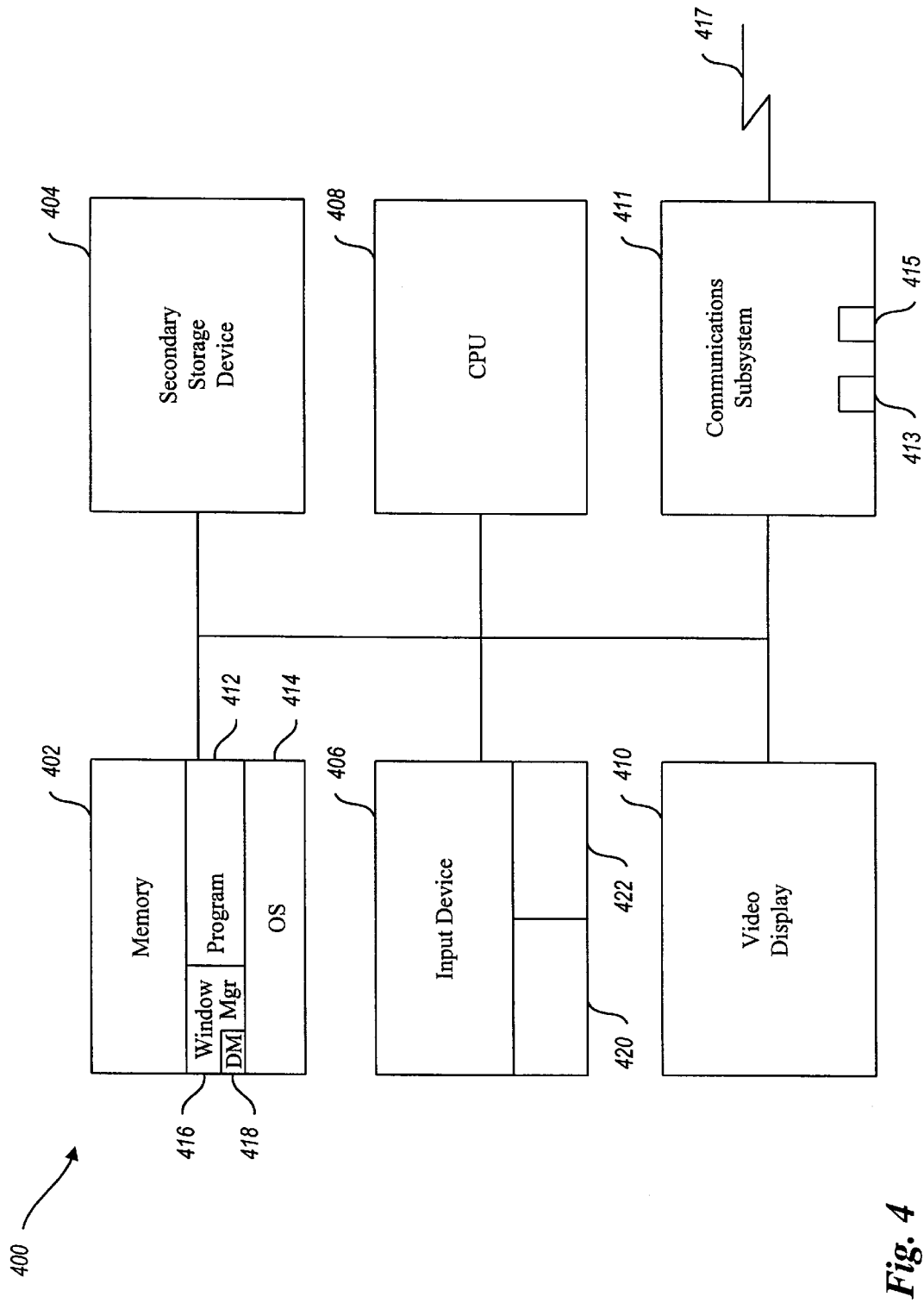
FIG. 4 depicts a computer system suitable for practicing a preferred embodiment of the present invention.

FIG. 4 depicts a computer system 400 suitable for practicing a preferred embodiment of the present invention. The computer system 400 contains a memory 402; a secondary storage device 404; an input device 406, such as a mouse with a left button 420 and a right button 422; a central processing unit (CPU) 408; and a video display 410. The memory 402 contains a program 412 and an operating system 414. The program 412 displays windows on the video display 410 by utilizing the windowing capabilities of the operating system 414. The operating system 414 is a windowing system, such as the Microsoft® Windows® 95 operating system sold by Microsoft Corporation. In order to display and manipulate windows on the video display 410, the program 412 has a window manager 416. The window manager 416 is responsible for persistently storing information pertaining to the windows that are displayed on the video display 410 so that upon reinvocation of the program, the windows are displayed in a consistent manner. The window manager 416 contains a docking manager 418. The docking manager 418 is responsible for performing all processing relating to the linking of two or more windows and unlinking of two or more windows. Also depicted as part of the computer system 400 is a communications subsystem 411, including a network adapter 413 and a modem 415, that provides for communication across network 417. One skilled in the art will appreciate that the computer system 400 may have additional or different components, such as a keyboard.

Figure 5A:
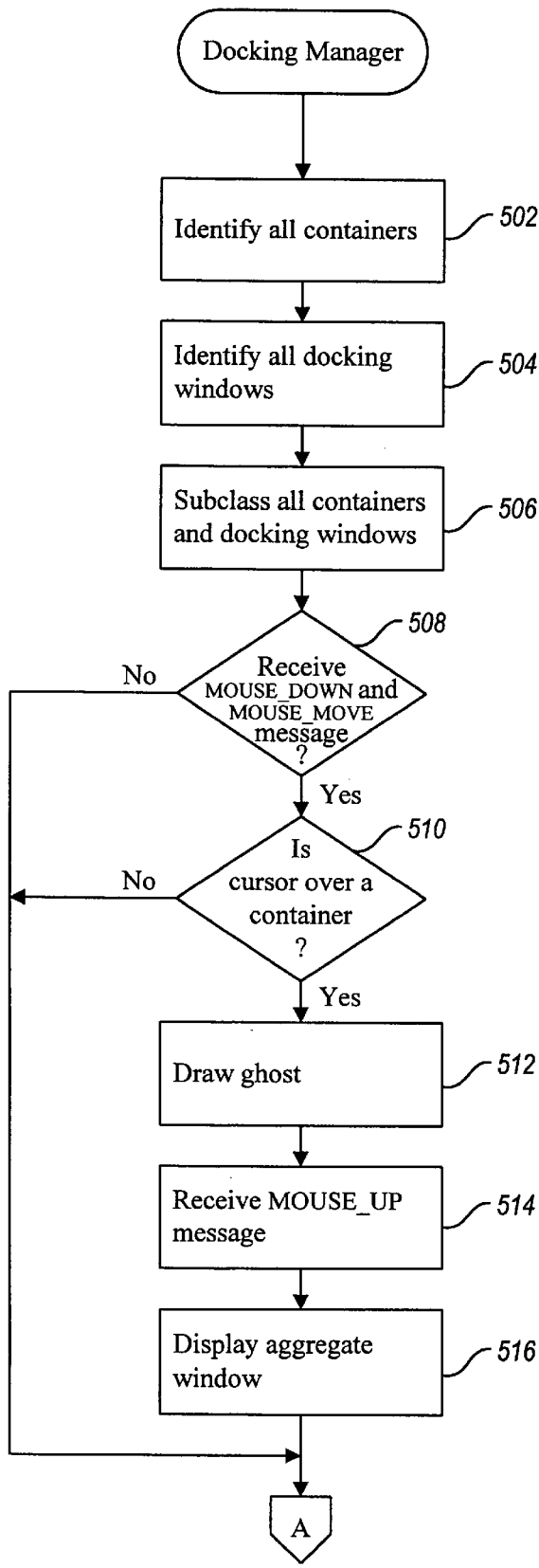
FIGS. 5A–5C depict a flowchart of the steps performed by the docking manager of a preferred embodiment of the present invention.
Figure 5B:
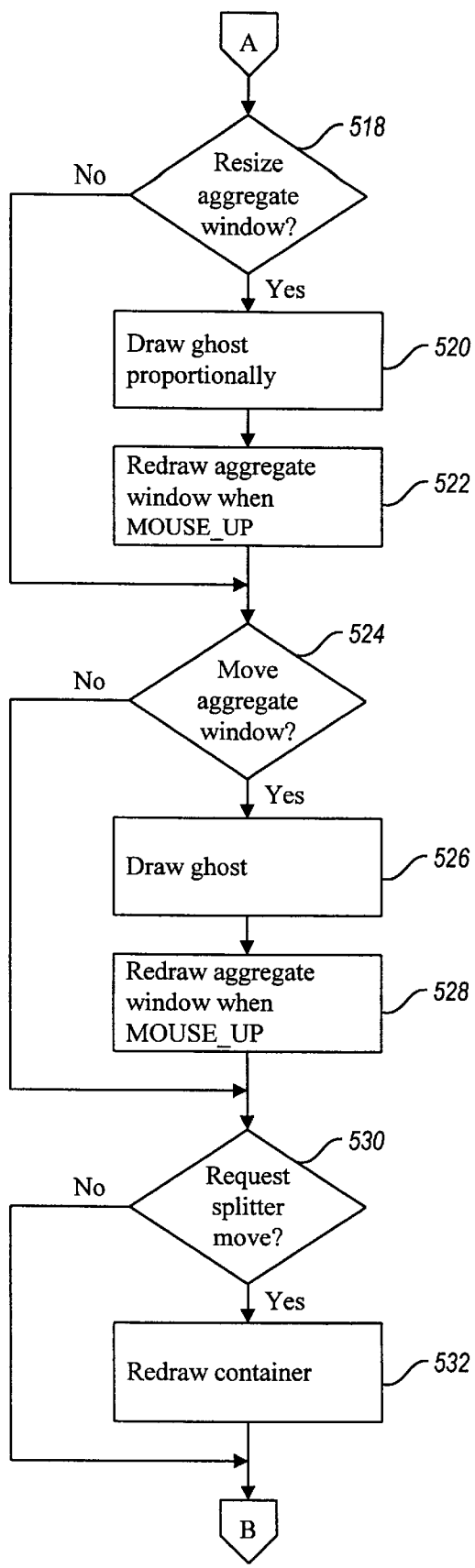
Figure 5C:
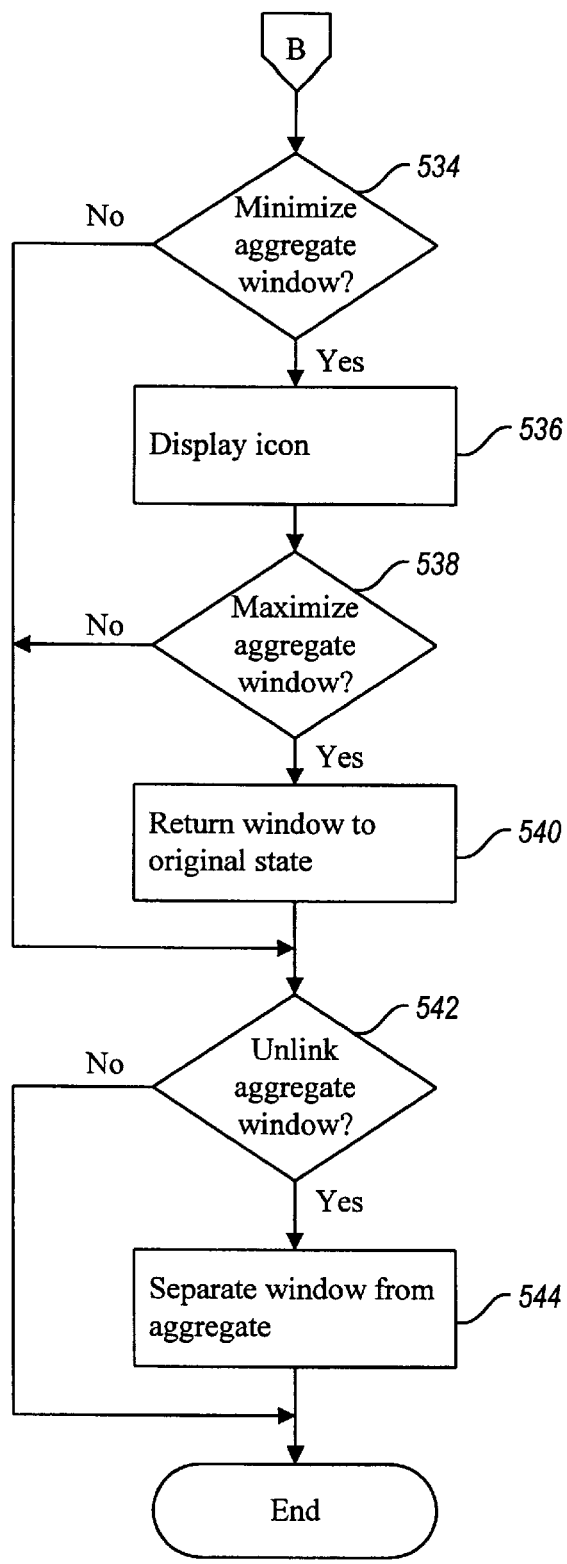

FIGS. 5A, 5B, and 5C depict a flowchart of the steps performed by the docking manager. Upon invocation, the docking manager first identifies all containers among the windows that the program is capable of displaying (step 502). In this step, the docking manager sends a message to the window procedure for each window requesting whether that window can be linked with. If the window can be linked with and is thus a container, the window returns a structure to the docking manager containing the window's location and the window's title. If the window is not a container, instead of returning a structure, the window returns a null pointer. The window's location is returned as Cartesian coordinates of the four corners of the window. The screen of the video display is divided into Cartesian coordinates, with the upper left-hand corner being (0,0), the upper right-hand corner being (400,0), the lower left-hand corner being (0,400), and the lower right-hand corner being (400,400). After identifying all containers, the docking manager identifies all docking windows that are capable of linking with a container (step 504). In this step, the docking manager sends a message to the window procedure of all windows, and the windows return a structure containing the position and the title of the window if it is a docking window. Otherwise, the windows return a null pointer.

After identifying all docking windows, the docking manager subclasses all identified containers and all identified docking windows so that the docking manager receives all messages destined for these windows (step 506). In this step, the docking manager utilizes the well-known "SetWindowLong" procedure provided by the operating system. Instead of using the SetWindowLong procedure, one skilled in the art will appreciate that other methods may be used to receive messages like the SetCapture well-known function of the Microsoft® Windows® operating system. After subclassing the containers and the docking windows, any messages, such as a MOUSE_MOVE message indicating movement of the mouse, a MOUSE_DOWN message indicating depression of the mouse button, or a MOUSE_UP message indicating release of the mouse button, are sent to the docking manager instead of the window.

Figure 6:
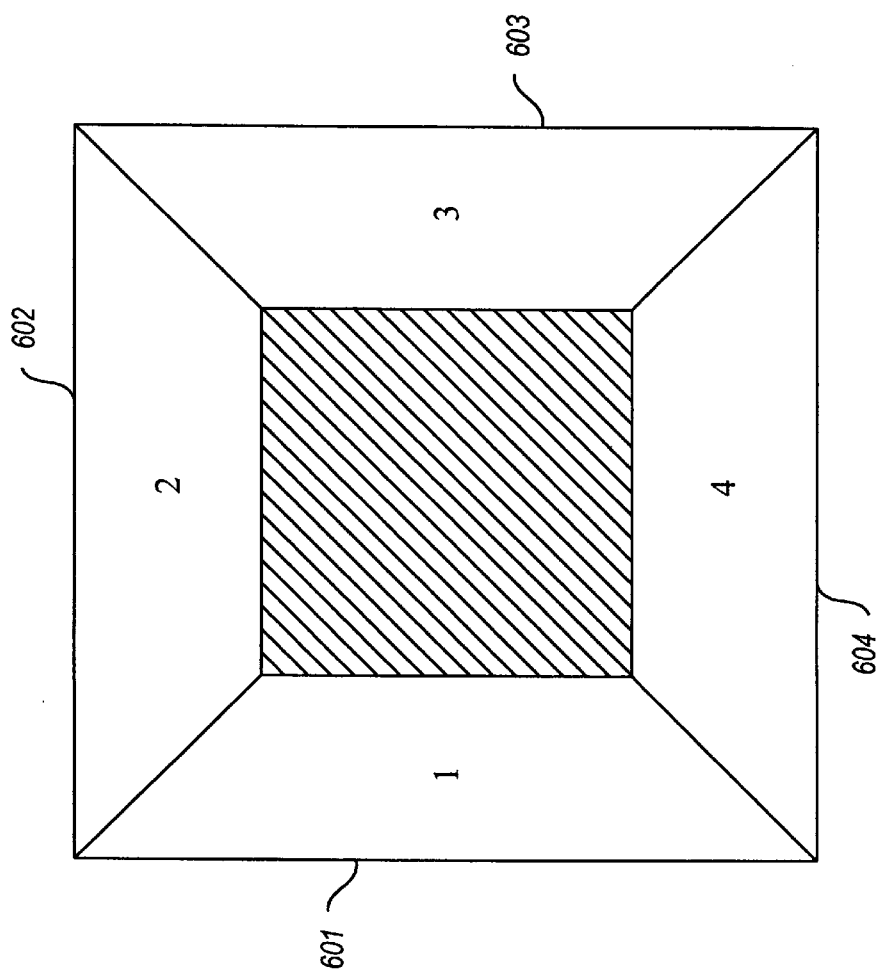
FIG. 6 depicts the four quadrants of a window of a preferred embodiment utilized by the docking manager when linking windows.

Next, the docking manager determines if it has received a MOUSE_DOWN and a MOUSE_MOVE message (step 508). Upon receiving both of these messages, the docking manager determines if a window linking operation is occurring. The docking manager makes this determination by determining if the mouse cursor is over a container (step 510). A MOUSE_MOVE message contains the coordinates of the mouse cursor. Thus, the docking manager compares these coordinates to the position of all its containers to determine if the cursor is over one of the containers. If the cursor is over a container, the docking manager draws a ghost at the location of the mouse cursor until a MOUSE_UP message is received (step 512). Subsequently, the docking manager receives a MOUSE_UP message (step 514) and displays an aggregate window (step 516). The docking manager displays an aggregate window by displaying both the docking window and the container as a single window with a title bar. The sizes of the docking window and the container within the aggregate window are determined as previously described. The docking window may be linked to any one of the four sides of the window. The docking manager determines which of the four sides to use by determining which quadrant of the container the mouse cursor is over when the mouse button is released. Each window is divided into four quadrants 601, 602, 603, and 604, as shown in FIG. 6, which indicate the side to which the docking window is linked. For example, if the mouse cursor is over quadrant 601, the docking window is linked to the left-hand side of the container. However, if the mouse cursor is over the shaded area 605, the docking window is not linked to the window; instead, the docking window is moved to the location of the mouse cursor.

After displaying the aggregate window, if the docking manager did not receive a MOUSE_DOWN and MOUSE_MOVE message, or if the cursor is not over a container, the docking manager determines if it has received a request to resize an aggregate window (step 518 in FIG. 5B). In this step, the docking manager receives a WMsize message from the operating system indicating that the user has positioned the cursor over a corner or a side of a window, depressed the mouse button, and is moving the mouse so as to resize the window. If the docking manager determines that a resize request has been received, the docking manager proportionally draws a ghost of the aggregate window indicating the location of the splitter bar (step 520). In this step, the proportionality of the sizes of the docking window and the container in the aggregate window is maintained. After drawing the ghost, the docking manager redraws the aggregate window when it receives a MOUSE_UP message (step 522).

Next, the docking manager determines if it has received a request to move an aggregate window (step 524). In this step, such a request is indicated by a WMmove message received from the operating system. If the docking manager determines that an aggregate window has been requested to be moved, the docking manager proportionally draws a ghost indicating the location of the splitter bar until receiving a MOUSE_UP message (step 526) and redraws the aggregate window when it receives the MOUSE_UP message (step 528).

After redrawing the aggregate window, or if a resize request was not received, the docking manager determines if a request has been received to move the splitter bar (step 530). In this step, the docking manager determines whether a MOUSE_DOWN message has been received, whether the cursor was over the splitter bar at the time, and whether a MOUSE_MOVE message was received. If a request to move the splitter bar has been received, the docking manager redraws the container with differing proportionalities of the docking window and the container in the aggregate window (step 532).

After redrawing the container, or if a request to move the splitter has not been received, the docking manager determines if a request to minimize an aggregate window has been received (step 534 in FIG. 5C). In this step, the user has activated a button on the window and the docking manager identifies the activation by receiving a MOUSE_DOWN message and determining that the location of the mouse cursor was over this particular button. Upon making this determination, the docking manager displays the window as an icon (step 536). After displaying the window in an iconic form, the docking manager determines if it has received a request to maximize the aggregate window (step 538). This determination is made by the docking manager determining if the user double-clicked the mouse button while the mouse cursor was over the icon. If a request has been received to maximize the aggregate window, the docking manager returns the aggregate window to its original state where it is fully functional.

If a request to minimize the aggregate window has not been received, if a request to maximize an aggregate window in iconic form has not been received, or after returning the window to its original state, the docking manager determines if a request has been received to unlink a window from an aggregate window (step 542). In this step, the docking manager determines whether it has received a MOUSE_DOWN message while the mouse cursor was over the title bar of the window to be unlinked, and whether a MOUSE_MOVE message has been received indicating that the user is dragging the window away from the aggregate window. If this condition is true, the docking manager separates the window from the aggregate window (step 544). In this step, the window is unlinked from the aggregate window and, thereafter, is manipulated independent of the aggregate window. After unlinking the window, if the aggregate window has only one window left in it, the title bar for the aggregate window is removed so that the window is displayed as a non-aggregate window. After separating the window, or if an unlink request has not been received, processing ends.

Figure 7:
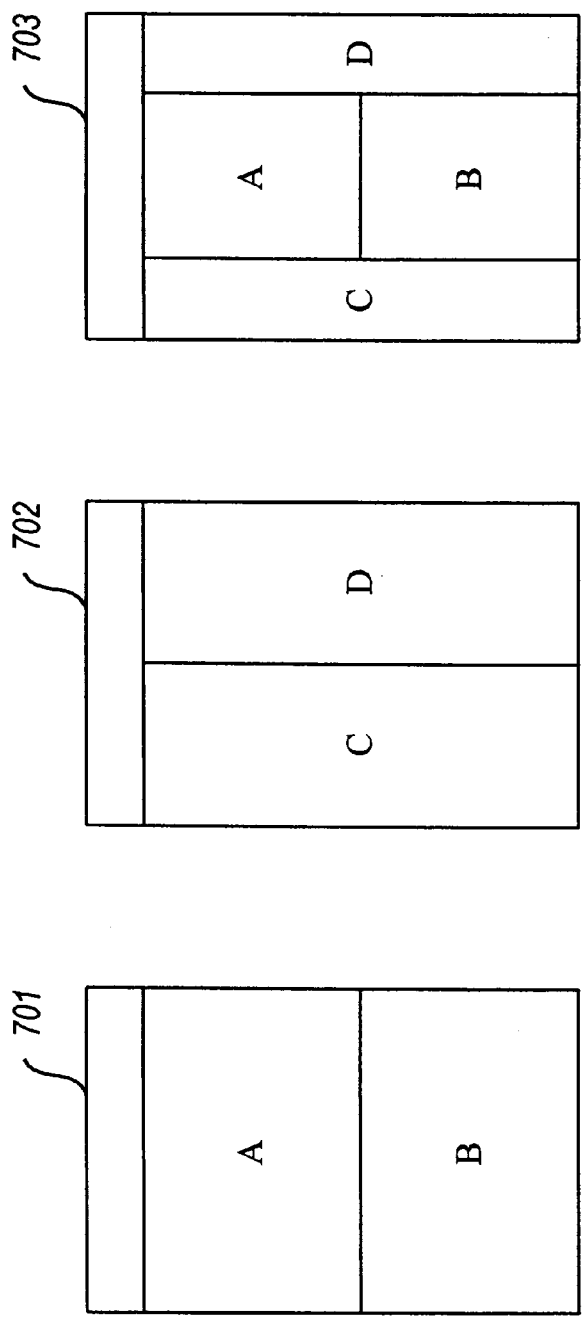
FIG. 7 depicts two aggregate windows being linked together.

It should be appreciated that if the window to which the docking window is to link is itself an aggregate window, then the docking window may be linked to any of the four sides of the windows that comprise the aggregate window. Also, one skilled in the art will appreciate that multiple aggregate windows may be linked together by the present invention. For example, as shown in FIG. 7, if a first aggregate window 701 comprises subwindow A on top of subwindow B and a second aggregate window 702 comprises subwindow C next to subwindow D, the two aggregate windows can be linked such that the resulting aggregate window 703 has the first aggregate window inserted between the subwindows of the second aggregate window.

While the present invention has been described with reference to a preferred embodiment thereof, those skilled in the art will know of various changes in form and detail that may be made without departing from the spirit and scope of the present invention as defined in the appended claims.

What is claimed is:

1. A method in a computer system having a video display for displaying information, comprising the steps of:

displaying a plurality of separate windows on the video display, each window having edge, wherein each separate window is manipulated independently of other separate windows;

evaluating the relative dimensions of the edges of two of the plurality of separate windows;

if the relative dimensions do not conform to a predetermined criterion, resizing at least one of the two of the plurality of windows to conform the dimensions along the edge to the predetermined criterion; and linking the two of the plurality of separate windows at their respective edges to form an aggregate window that is manipulated as a single window.

2. The method of claim 1 wherein the step of linking is performed responsive to user input.

3. The method of claim 2, further including the steps of receiving first input indicating that a first of the two separate windows has been selected, receiving second input indicating that the first of the two separate windows has been moved over a second of the two separate windows, and receiving third input indicating that the first of the two separate windows has been dropped on the second of the two separate windows after being moved over the second of the two separate windows, and wherein the step of linking is performed responsive to the dropping of the first of the two separate windows.

4. The method of claim 3 wherein the second of the two separate windows has a plurality of edges, wherein the step of receiving third input includes dropping the first of the two separate windows at one of the edges and wherein the step of linking includes displaying the first of the two separate windows at the one edge of the second of the two separate windows.

5. The method of claim 1 wherein the second of the two separate windows covers an area of the video display, and wherein the step of linking includes displaying both the first and the second of the two separate windows within the area.

6. The method of claim 5 wherein the first of the two separate windows has a size, wherein the second of the two separate windows has a size, and wherein the step of displaying both the first and the second of the two separate windows within the area includes displaying both the first and the second of the two separate windows such that a ratio of the size of the first of the two separate windows to the size of the second of the two separate windows is maintained.

7. The method of claim 1, further including the step of unlinking the aggregate window to form the two separate windows such that the two separate windows are manipulated independently of each other.

8. The method of claim 1, further including the step of receiving input to manipulate the aggregate window and manipulating the aggregate window as a single window.

9. The method of claim 8 wherein the step of receiving input includes the step of receiving input indicating a request to resize the aggregate window and wherein the step of manipulating includes resizing the aggregate window.

10. The method of claim 9 wherein the aggregate window covers an area of the video display, wherein the first of the two separate windows is located in a first portion of the area, wherein the second of the two separate windows is located in a second portion of the area, and wherein the step of resizing the aggregate window includes resizing the aggregate window such that a ratio of a size of the first portion to a size of the second portion remains constant.

11. The method of claim 8 wherein the step of receiving input includes the step of receiving input indicating a request to move the aggregate window and wherein the step of manipulating includes moving the aggregate window.

12. The method of claim 8 wherein the step of receiving input includes receiving input indicating a request to minimize the aggregate window, and wherein the step of manipulating includes minimizing the aggregate window.

13. The method of claim 12, further including the steps of receiving input indicating a request to maximize the aggregate window, and maximizing the aggregate window.

14. The method of claim 1 wherein the step of linking includes displaying the first of the two separate windows adjacent to the second of the two separate windows.

15. The method of claim 14 wherein the step of displaying includes displaying a splitter bar between the first and the second of the two separate windows.

16. The method of claim 15, further including the steps of receiving input indicating a request to move the splitter bar and moving the splitter bar.

17. The method of claim 1 wherein the step of displaying includes the step of displaying a third window that contains the two separate windows.

18. The method of claim 1 wherein the step of linking includes displaying a title bar for the aggregate window.

19. The method of claim 1, further including the steps of displaying a third separate window and linking the third separate window to the aggregate window such that the first separate window, the second separate window, and the third separate window are manipulated as a single window.

20. A computer-readable medium containing instructions for controlling a computer system to perform a method, the computer system having a video display for displaying information to a user, the method comprising the steps of:
displaying two separate windows on the video display, each window having an edge, wherein in each separate window is manipulated independently of the other separate windows;
receiving an indication to move a first of the separate windows;
moving the first window in response to receiving the indication;
determining when the first window is over a second of the separate windows;
receiving an indication that the first window has been dropped when it is determined that the fist window is over the second window;
evaluating the relative dimensions of the edges of the first and second windows;
if the relative dimensions do not conform to a predetermined criterion, resizing at least one of the windows to conform the dimensions along the edge to the predetermined criterion; and
linking the first window and the second window along their respective edges to form an aggregate window such that the first window and the second window are manipulated as a single window.

21. The computer-readable medium of claim 20 wherein the step of displaying includes displaying a third window that contains the two separate windows.

22. The computer-readable medium of claim 20, further including the step of receiving input to manipulate the aggregate window and manipulating the aggregate window as a single window.

23. The computer-readable medium of claim 22 wherein the step of receiving input includes receiving an indication to resize the aggregate window and wherein the step of manipulating includes resizing the aggregate window.

24. The computer-readable medium of claim 22 wherein the step of receiving input includes receiving an indication to move the aggregate window and wherein the step of manipulating includes moving the aggregate window.

25. The computer-readable medium of claim 20 wherein the step of linking includes displaying the first window adjacent to the second window.

26. The computer-readable medium of claim 20 wherein the step of linking includes displaying a title bar for the aggregate window.

27. The computer-readable medium of claim 20, further including the step of unlinking the aggregate window to separate the first window and the second window.

28. The computer-readable medium of claim 27 wherein the first window has a title bar and wherein the step of unlinking the aggregate window includes receiving an unlink indication that the title bar has been selected and is being dragged away from the aggregate window and wherein the unlinking of the aggregate window is responsive to the receiving the unlink indication.

29. The computer-readable medium of claim 20 wherein the computer system has a plurality of programs and wherein the step of displaying two separate windows includes displaying the first window by a first of the programs and displaying the second window by a second of the programs.

30. A method in a computer system having a video display for displaying information and an application program for displaying plurality of windows on the video display, the method performed by a docking manager of the application program comprising the steps of:
displaying windows on the video display that receive messages reflecting user input, each widow having an edge, a plurality of the windows being container windows and a plurality of the windows being docking windows, wherein a docking window is able to be linked to a container window;
determining which among the displayed windows are the container windows;
determining which among the displayed windows are docking windows;
subclassing the container windows and the docking windows such that the docking manager receives messages destined for both the container windows and the docking windows;
receiving a message indicating that a docking window is moving;
while the docking window is moving;
receiving a message indicating that the docking window is located over a container window; and
while the docking window is located over the container window,
receiving a message indicating that the docking window has been dropped;
evaluating the relative dimensions of the edges of the docking and container window;
if the relative dimensions do not conform to a predetermined criterion, resizing at least one of the docking and container windows to conform the dimensions along the edge to the predetermined criterion; and
linking the docking window to the container window along their respective edges to form an aggregate window such that the aggregate window is manipulated as a single window responsive to the receiving the message indicating that the docking window has been dropped.

31. The method of claim 30 wherein each container window has a plurality of quadrants, wherein the step of receiving a message indicating that the docking window has been dropped includes determining a quadrant on which the docking window has been dropped, and wherein the step of linking the docking window includes displaying the docking window at the determined quadrant.

32. The method of claim 30, further including the steps of receiving a message indicating a request to resize the aggregate window after linking the docking window, and resizing the aggregate window.

33. The method of claim 32 wherein the step of receiving a message indicating a request to resize the aggregate window includes drawing a tentative indication of the aggregate window after the resizing occurs.

34. The method of claim 30, further including the steps of receiving a message indicating a request to move the aggregate window after linking the docking window, and moving the aggregate window.

35. The method of claim 34 wherein the step of receiving a message indicating a request to move the aggregate window includes drawing a tentative indication of a location of the aggregate window after the moving occurs.

36. The method of claim 30, further including the step of unlinking the docking window from the container window.

37. The method of claim 30 wherein the step of displaying windows on the video display includes displaying the windows as part of a parent window that contains the displayed windows.

38. A computer system, comprising:

a video display for displaying information;

an input device for receiving input from a user;

a memory containing a program for separately displaying two windows, each window having as edge, on the video display, for receiving first input from the user via the input device, for evaluating the relative dimensions of the edges of the two windows, for resizing the edge of at least one of the two windows to conform the dimensions along the edge to a predetermined criterion, for linking the two windows to form an aggregate window in response to receiving the first input, for receiving second input requesting manipulation of the aggregate window, and for manipulating the aggregate window as a single window in response to receiving the second input; and a processor for running the program.

39. The computer system of claim 38 wherein the program is an application program.

40. The computer system of claim 38 wherein the program is an operating system.

41. The computer system of claim 38 wherein the program displays the two windows adjacent to each other after linking the two windows.

42. The computer system of claim 41 wherein the program displays a splitter bar between the two windows.

43. The computer system of claim 38 wherein the program displays a title bar for the aggregate window.

44. The computer system of claim 38 wherein the two windows are displayed as part of a parent window.

45. A computer-readable medium containing instructions for controlling a computer system to perform a method, the computer system having a video display for displaying information, the method comprising the steps of:

displaying a plurality of separate windows on the video display, each window having an edge, wherein each separate window is manipulated independently of other separate windows;

evaluating the relative dimension of the edges of two of the plurality of separate window;

if the relative dimension do not conform to a predetermined criterion, resizing at least one of the two of the plurality of windows to conform the dimensions along the edge to the predetermined criterion; and linking the two of the plurality of separate windows along their respective edges to form an aggregate window that is manipulated as a single window.

* * * * *

UNITED STATES PATENT AND TRADEMARK OFFICE
CERTIFICATE OF CORRECTION

PATENT NO.    : 5,977,973
DATED         : November 2, 1999
INVENTOR(S)   : David A. Sobeski; Philippe P.A. Nicolle It is certified that error appears in the above-identified patent and that said Letters Patent is hereby corrected as shown below:

IN THE CLAIMS:

In Claim 20, Column 11, line 19: "fist" should read --first--

Signed and Sealed this

First Day of August, 2000

*Attest:*

Q. TODD DICKINSON

*Attesting Officer*           *Director of Patents and Trademarks*